Oct. 16, 1951 V. L. GARRISON 2,571,857
MEANS FOR EFFECTING CABLE JOINTS
Filed Sept. 28, 1948

INVENTOR.
Vernon L. Garrison
BY James G. Beckell
ATTORNEY

Patented Oct. 16, 1951

2,571,857

UNITED STATES PATENT OFFICE 2,571,857

MEANS FOR EFFECTING CABLE JOINTS

Vernon L. Garrison, Clifton, N. J., assignor to The Okonite-Callender Cable Company, Incorporated, Paterson, N. J., a corporation of New Jersey Application September 28, 1948, Serial No. 51,560

1 Claim. (Cl. 287—20.2)

This invention relates to an improvement in electric power cables, and particularly to the construction employed at the joints.

It is conventional practice to install lead sheathed power cables in duct systems with the cable joints racked in manholes at intervals along the line. It is customary practice, also, in this industry, to wipe the ends of the joint sleeves to the cable sheath.

Electric power cables in normal operation carry loads which are not steady, and for this and other reasons, cable temperatures vary, causing corresponding variations in longitudinal expansion, resulting in cable movement into and out of the manhole.

Consequently, the cable at each manhole is trained in an expansion loop containing the joint. This loop increases and decreases with cable expansion and contraction so that the loop is bent backward and forward. This is recognized in the industry and is known as "manhole bending," and sometimes causes the metal sheath of the cable to crystallize from fatigue and to crack open, in turn causing cable failure.

From my study of this subject and tests I have run, I have found a concentration of stress in the sheath directly adjacent to the conventional lead wiped seal at each end of the joint sleeve. In addition, this section of the sheath is exposed to the entire heat required in making the wiped seals which may have an effect on the metal of the sheath and reduce its fatigue resistance.

The primary object of the present invention is to overcome these difficulties.

Figure 1:
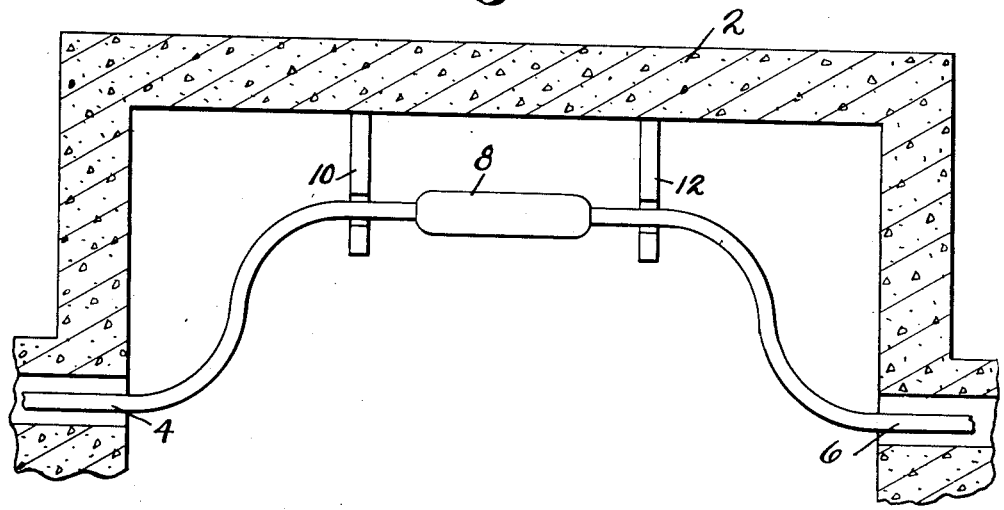
Fig. 1 is a fragmentary plan view of a cable taken at a manhole and showing conventional construction.

Referring to the drawings in detail, 2 designates a manhole of conventional design, and 4 and 6 designate the adjacent ends of two sections of lead sheathed electric power cable which extend into the manhole where they are spliced to each other, the joint sleeve being designated 8. The joint sleeve surrounds the splice as will be understood. Customarily after the cable conductors have been spliced together and the joint sleeve 8 slipped into position over the splice, the two ends of the joint sleeve are wiped to the cable sheath.

The joints are racked in the manhole, the racks having been designated 10 and 12.

As will be apparent from the drawings, the location of the racks with respect to the entry of the cable ends into the manhole provides the expansion loop I have referred to, which embraces the two ends of the cable and the joint.

As the cable contracts and expands longitudinally, due to cable operation, the aforementioned loop increases and decreases. This is the manhole bending I have referred to and while it is necessary and is present in my improved construction, I have provided for a reduction in possible damage to the cable from this action.

Figure 2:
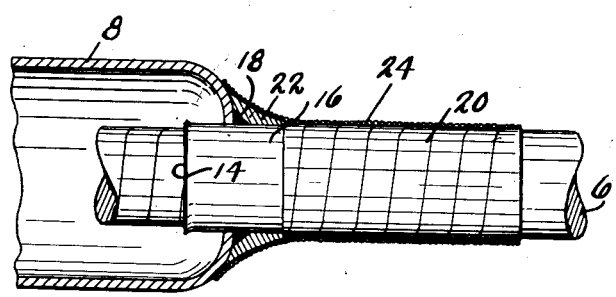
Fig. 2 is a fragmentary sectional elevational view illustrating one embodiment of my invention.

Referring now to Fig. 2 of the drawings, 8 designates the joint sleeve and 6 one end of a lead sheathed cable which passes into the joint sleeve and which is to be spliced to the adjacent end of another lead sheathed cable which is passed into the manhole as will be understood. Before beginning the splicing operation the lead sheath is removed from the cable a short distance. In Fig. 2, for example, the sheath has been stripped back to the point 14. The end of the sleeve 8 is hammered down on the sheath 16 and soldered with a fillet of solder 18. I then apply a heat-resisting material, such as, asbestos paper tape, 20, for example, about the cable sheath for three or four inches along the sheath. I then wipe the sleeve 8 to the sheath as shown at 22. To complete the operation I next apply a serving of small copper wire 24 about the heat-resisting material 20 and over the wipe 22, and lightly wipe this serving with solder. This construction reduces bending stress concentration at the ends of the joint sleeve. I find also that it reduces detrimental heating of the sheath from soldering and wiping at the joint sleeve ends. I tested this construction in a standard bending machine to more than four times the bending cycles required to cause failure of a similar cable jointed in conventional fashion. The test was then discontinued. The cable showed no sign of cracking or other strain.

Figure 3:
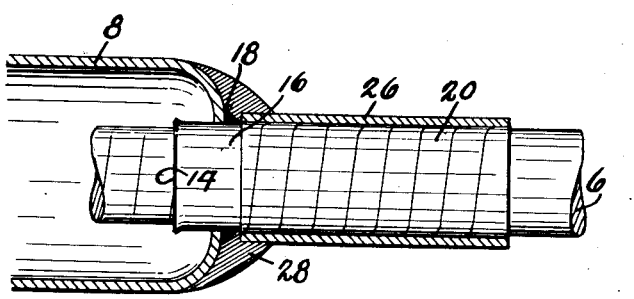
Fig. 3 is a view similar to Fig. 2 of another embodiment of the invention.

In the construction illustrated in Fig. 3, the joint sleeve 8 is hammered down to the sheath 16 and soldered with a fillet of solder 18 as in the joint of Fig. 2. Heat-resistant material, such as asbestos paper tape 20, is then wrapped about the cable sheath 16 outside the joint sleeve for several inches. I then apply a lead sheet 26 about the heat resistant material 20. This lead sheet may be made up from the lead removed from the cable in preparing the cable for splicing as above explained, its two edges soldered together to provide a longitudinal seam. I then wipe the joint sleeve to the sheet 26 as shown at 28. This construction was tested in a standard bending machine for double the cycles required to cause failure in conventional cable at which time the test was discontinued. There were no signs of cracking or other strain.

From all of the foregoing it will be appreciated that I have provided a construction at the joints in electric cables wherein the probability of cable failure at the ends of the joint sleeves due to bending stress concentration because of longitudinal contracting and expanding of the cable has been reduced to a minimum; it will be appreciated also that my construction also provides for protection of the cable sheath against damage by soldering when wiping the sleeve to the cable sheath, thus reducing failures at the ends of the joint due to the soldering and wiping heats.

It is to be understood that changes may be made in the details of construction described without departing from my invention.

What I claim is:

In an electric cable, the combination of a metal sheathed cable and a joint therefor, said joint comprising a joint sleeve snugly fitting about the cable sheath, the end of the sleeve being soldered to the cable sheath, heat-resistant material wrapped about the cable sheath said material extending rearwardly from the joint sleeve for a substantial distance along the sheath, and a metal sleeve about the heat-resistant material wiped to the joint sleeve.

VERNON L. GARRISON.

REFERENCES CITED

The following references are of record in the file of this patent:

UNITED STATES PATENTS

| Number | Name | Date |
|---|---|---|
| 516,161 | Loe | Mar. 6, 1894 |
| 2,306,331 | Elmer | Dec. 22, 1942 |
| 2,314,950 | Pope | Mar. 30, 1943 |
| 2,321,731 | Bouton et al. | June 15, 1943 |